Patented Feb. 14, 1950

2,497,130

UNITED STATES PATENT OFFICE 2,497,130

MANUFACTURE OF SULFOARYL-AMIDES OF AROMATIC CARBOXYLIC ACIDS

Herbert August Lubs, Wilmington, Del., and Walter Valentine Wirth, Woodstown, Louis Spiegler, Woodbury, and J. Allington Bridgman, Salem, N. J., assignors to E. I. du Pont de Nemours & Company, Wilmington, Del., a corporation of Delaware No Drawing. Application June 29, 1948,
Serial No. 35,985

7 Claims. (Cl. 260—507)

This invention relates to the preparation of sulfoaryl-amides of aromatic carboxylic acids, and more particularly it deals with a novel and improved method of preparing these directly from the corresponding sulfoaryl-amine and aromatic carboxylic acid chloride.

It is an object of this invention to provide a practical method for the preparation of sulfoaryl-amides of aromatic carboxylic acids, that is, compounds which may also be designated as aroyl-amino-derivatives of aromatic sulfonic acids. Other and further important objects of this invention will appear as the description proceeds.

It has been known that aroyl derivatives of aromatic amines may be prepared by condensing the corresponding aromatic carbonyl chloride and aromatic amine in an aqueous medium in the presence of an alkaline agent such as sodium hydroxide, sodium carbonate and calcium carbonate. This method, however, is workable only with such carbonyl chlorides as do not hydrolyze readily to give back the corresponding free carboxylic acid, or in such cases where the hydrolysis rate of the carbonyl chloride is much slower than the reaction rate with the particular arylamine employed. Once the free carboxylic acid has been formed, condensation with the arylamine under the specified conditions no longer proceeds. The condensation of para-toluyl chloride or para-anisoyl chloride with diamino-disulfo-stilbene may be cited as examples of such unworkable cases.

It has been indicated in the literature that aryl-amines may be combined with aryl carbonyl chlorides under anhydrous conditions, using pyridine in the joint function of solvent and acid-binding agent. Such process, however, is strictly a laboratory process. The high cost of pyridine and the difficulty of its recovery from a reaction mass of the above type, would render the suggested process impractical on a plant scale.

We have now found that the condensation of diamino-disulfo-stilbenes with benzoyl chloride or a nuclear substitution derivative thereof may be successfully achieved by effecting the reaction in a water-immiscible, inert, organic liquid, provided a water-immiscible tertiary amine is present in the reaction mass in sufficient quantity to neutralize any free SO₃H groups present and to absorb any HCl liberated in the process. Alternatively, one may start initially with a salt of the sulfonic acid, for instance, the sodium sulfonate, in which event it is sufficient to have enough tertiary base present to absorb the liberated HCl. Inasmuch as the condensation process may be expressed by the equation:

$$MO_3S\!-\!R_1\!-\!NH_2 + R_2\!-\!COCl \rightarrow MO_3S\!-\!R_1\!-\!NH\!-\!CO\!-\!R_2 + HCl$$

the above statements concerning the quantity of tertiary base may be summarized by the rule that there be present at least one mole of tertiary base for each $NH_2$ radical and for each free $SO_3H$ radical in the aryl-amino-sulfonic acid employed.

The selection of a water-insoluble inert liquid medium jointly with a water-insoluble tertiary base, brings about the advantage that both the tertiary base and inert liquid may be recovered economically and efficiently by steam distillation. It is merely necessary to treat the reaction mass during this stage with aqueous alkali, to set free again any of the tertiary base which may have been bound to HCl or to the $SO_3H$ groups. Steam distillation thus separates the inert liquid and tertiary base, in the form of an oily phase, from the desired reaction product, which is partially dissolved and partially suspended in the aqueous phase.

If desired, the alkali treatment may be introduced at such a stage as to effect further separation between the inert liquid and the tertiary base. For instance, the steam distillation may be started before addition of any alkali, and continued until all the inert solvent has distilled over. Aqueous alkali is then added gradually to liberate any acid-bound tertiary base, and distillation is continued until all the tertiary base has been liberated and distilled. The aqueous residue in the still then contains the bulk of the reaction product. To insure good volatility with steam, it is desirable to select as inert reaction medium a water-insoluble organic liquid which boils at a temperature between 75° and 220° C.

The tertiary amine should likewise be water-immiscible and should preferably boil between 50° and 225° C. Extreme insolubility with water, however, is not required of the tertiary base. It is sufficient if the tertiary amine is so much more poorly soluble in water than in the inert liquid employed as to be dissolved mostly by the latter. A distribution coefficient of not greater than 0.1 can be laid down as a general rule (that is, $S_W:S_L=1:10$ or less than $1:10$, $S_W$ being the quantity dissolved in water, while $S_L$ is the quantity dissolved in the organic liquid). In such a case, the organic layer of the distillate contains the bulk of the inert, organic liquid and the bulk of the tertiary amine, and may be re-used directly or after suitable enrichment, in a subsequent operation of the same nature.

The tertiary base presumably reacts first with any free sulfonic acid groups present to form a salt thereof. From this viewpoint, it is recommended to select a tertiary base which is strong enough to react with sulfonic acid groups. To express the same idea in different words, the tertiary base should preferably be one which has in water a pH-value of 10 to 14.

Benzene, toluene, xylene, chlorobenzene, tetralin and Stoddard solvent (a petroleum fraction) are illustrations of suitable organic liquid. Dimethyl-cyclohexylamine, diethylcyclohexylamine, tri-butylamine and quinoline may be mentioned as illustrations of suitable tertiary bases.

The reaction is preferably carried out at a temperature between 100° and 150° C. Where the inert liquid or tertiary base boils below the desired reaction temperature, the reaction is carried out in a closed vessel. Where the chosen combination of liquid and base boils just within the above range, the reaction may be carried out at the reflux temperature of the reaction mass. Toluene, commercial xylene, and mono-chlorobenzene are very convenient choices from the latter viewpoint.

Our process is of particular value when applied to the condensation of 4,4'-diamino-2,2'-disulfostilbenes with benzoic acid or nuclear substitution derivatives thereof, such as p-toluic acid, p-anisic acid, 3,4-dimethoxy-benzoic acid, etc., in view of the commercial interest of the resulting products and in view of their apparent inability of being prepared by the aforementioned older methods.

In general outline, our preferred mode of procedure is substantially as follows: The dry 4,4'-diamino-stilbene-2,2'-disulfonic acid is suspended in an inert solvent such as toluene, and sufficient diethyl cyclohexylamine is added to form the tertiary nitrogen base salt of the sulfonic acid and to form tertiary base hydrochloride from the HCl liberated as the amide is produced. A small amount of solvent is preferably distilled off at the beginning, to remove traces of water. The aromatic carboxylic-acid-chloride is then added in a small excess over the stoichiometrical quantity and the reaction mass is heated for a few hours to complete the reaction, as shown by testing a sample for free NH$_2$. Water is then added, and the mass is steam distilled while gradually adding to it aqueous alkali (NaOH, KOH, etc.) to set free the acid-bound nitrogenous base. The inert, organic liquid and tertiary base collect in the oily phase of the distillate and are drawn off for re-use. The residual aqueous mass is cooled and the dialkali-sulfonate of the diaroyl-diamido-stilbene is recovered.

The recovered salt may be acidified to give the free diaroyl-diamido-stilbene-disulfonic acid, and from the latter, by reaction with suitable bases, any desirable salt of the sulfonate may be formed, for instance the potassium, calcium, ammonium or pyridinium salts.

Without limiting this invention, the following examples will illustrate our preferred mode of operation. Parts mentioned are by weight.

*Example 1*

Distil a mixture of 46.9 parts of 4,4'-diamino-stilbene-2,2'-disulfonic acid, 99 parts of diethyl-cyclohexylamine and 560 parts of toluene, taking off approximately 130 parts of distillate to remove traces of water. Cool the charge and add 42.6 parts of p-toluyl chloride at 100°-110° C. Reflux for about 8 or 9 hours, cool below 80° C., add 500 parts of water, and steam distil with gradual addition of sufficient sodium hydroxide to release the diethyl-cyclohexylamine from its salts. Practically all of the toluene and diethylcyclohexylamine appear in the oil layer of the distillates. Salt the aqueous layer with 5% salt, cool and filter. Wash the product with brine and dry. The product obtained is practically free from primary amine and constitutes disodium-4,4' - bis - (p-methyl - benzoylamino) - stilbene-2,2'-disulfonate.

*Example 2*

Distil a mixture of 11.6 parts of 4,4'-diamino-stilbene-2,2'-disulfonic acid, 30 parts of tri-n-butylamine and 150 parts of monochloro-benzene, taking off approximately 40 parts of distillate to remove traces of water. Cool the charge and add 11.7 parts of p-anisoyl chloride. Reflux for 2½ hours, then add 3 parts of tri-n-butylamine and 1 part of p-anisoyl chloride. Reflux for 6 hours, then cool below 80° C.; add 100 parts water and steam-distil with gradual addition of sufficient sodium hydroxide to release the tri-n-butylamine from its salts. Practically all of the chlorobenzene and tri-n-butylamine appear in the oil layer of the distillates and are recovered. Cool the residual aqueous charge, filter, wash the product with brine and dry. The product is practically free from primary amine and constitutes disodium-4,4'-bis-(p - methoxy - benzoylamino)-stilbene-2,2'-disulfonate.

It will be understood that the details of procedure may be varied considerably, within the skill of those engaged in this art. For example, in cases where it is not desired to prepare and isolate the acid chloride by the known methods, the acid chloride can be made by heating the corresponding carboxylic acid or a salt thereof, dissolved or suspended in the solvent to be used in the condensation step (e. g. toluene or xylene), with POCl$_3$ or PCl$_5$ and adding this entire reaction mass to the solution or suspension of the amino-aromatic sulfonic acid containing sufficient tertiary nitrogen base to neutralize all the acidic components.

Although our invention has been described with particular reference to 4,4'-diamino-stilbene-2,2'-disulfonic acid, it may be applied also to other aryl-amino-sulfonic acids.

The aromatic carbonyl chloride may be of the benzene or naphthalene series and may be ring-substituted with groups which are not reactive, that is, groups which undergo no change when heated with the reactants under the conditions employed to form the acid chloride.

The amino aromatic sulfonic acids may likewise be ring-substituted with inactive groups as mentioned above. The tertiary nitrogen base may be selected on the basis of economic and operating conditions which show the greatest advantage. If the amino-aryl-sulfonic acid is considerably cheaper than the carboxylic-acid chloride, it may be used in excess over the stoichiometric quantity where it can be easily separated from the product.

It can be readily seen that our invention leads to important and economical advantages as follows:

(1) The excess of carboxylic acid chloride required to obtain high yields can be kept low enough to make it unnecessary to recover the small amount of carboxy acid formed during the alkaline treatment. (2) The amino aromatic sulfonic acid is practically all reacted to form the amide. For example, in the case of 4,4'-diamino-stilbene-2,2'-disulfonic acid, there is less than 1% unreacted amine by nitrite test. (3) The solvent and the tertiary nitrogen base can be recovered simply by steam distillation and used over again. (4) Since the condensation is carried out in a non-aqueous medium which may be kept alkaline throughout the progress of the condensation by the use of a small excess of tertiary nitrogen base, it is not necessary to effect the condensation in glass lined equipment. Stainless steel can be used to advantage since there is negligible corrosion.

For the purpose of the claims below, the terms "water-insoluble" or "water-immiscible," when applied to an organic liquid, shall be construed as meaning a solubility in water not exceeding 1% by weight at room temperature.

We claim as our invention:

1. The process of producing a diaroyl-diamino-stilbene-disulfonate, which comprises refluxing together in a water-immiscible, inert, organic liquid which boils at a temperature between 100° and 150° C., 4,4'-diamino-disulfo-stilbene, a monocyclic aroyl chloride, and diethyl-cyclohexylamine.

2. A process as in claim 1, the stilbene compound being initially in the form of disodium-sulfonate, the quantity of diethyl-cyclohexylamine employed being at least 2 moles per mole of 4,4'-diamino-disulfo-stilbene employed.

3. A process as in claim 1, the stilbene compound being initially in the form of free disulfonic acid, the quantity of diethyl-cyclohexylamine employed being at least 4 moles per mole of 4,4'-diamino-disulfo-stilbene employed.

4. A process as in claim 1, including further the steps of steam distilling the reaction mass while simultaneously feeding into it aqueous alkali in quantity sufficient to liberate any of the diethyl-cyclohexylamine which became neutralized during the reaction.

5. The process of producing 4,4'-di-(p-anisoyl-amino)-2,2'-disulfo-stilbene, which comprises refluxing together in a water-immiscible, inert, organic liquid which boils at a temperature between 100° and 150° C., 4,4'-diamino-stilbene-disulfonic acid, p-anisoyl chloride, and diethyl-cyclohexylamine.

6. A process as in claim 5, including further the steps of steam distilling the reaction mass while simultaneously feeding into it aqueous alkali in quantity sufficient to liberate any of the diethyl-cyclohexylamine which became neutralized during the reaction.

7. A process of producing a diaroyl-diamino-stilbene-disulfonate, which comprises reacting 4,4'-diamino-2,2'-disulfo-stilbene with a monocyclic aromatic carbonyl chloride in a water-immiscible, inert, organic liquid containing further a water-immiscible, tertiary nitrogenous base, then adding water to the reaction mass, and steam distilling the latter with simultaneous addition of aqueous alkali to liberate the acid-bound tertiary base and to effect its separation, together with the inert organic liquid, in the oily phase of the distillate.

HERBERT AUGUST LUBS.
WALTER VALENTINE WIRTH.
LOUIS SPIEGLER.
J. ALLINGTON BRIDGMAN.

REFERENCES CITED

The following references are of record in the file of this patent:

UNITED STATES PATENTS

| Number | Name | Date |
|---|---|---|
| 994,420 | Neelmeier et al. | June 6, 1911 |
| 1,874,581 | Neelmeier et al. | Aug. 30, 1932 |
| 1,891,159 | Hooley et al. | Dec. 13, 1932 |
| 1,899,856 | Guillaume et al. | Feb. 28, 1933 |
| 1,927,936 | Hentrich et al. | Sept. 26, 1933 |
| 1,932,180 | Guenther et al. | Oct. 24, 1933 |
| 2,299,834 | Martin et al. | Oct. 27, 1942 |
| 2,468,431 | Eberhart et al. | Apr. 26, 1949 |

FOREIGN PATENTS

| Number | Country | Date |
|---|---|---|
| 59,158 | Switzerland | of 1912 |
| 25,332 | Norway | of 1915 |
| 315,200 | Great Britain | of 1929 |
| 442,530 | Great Britain | of 1936 |
| 584,484 | Great Britain | of 1947 |